United States Patent [19]

Doi

[11] 4,090,346
[45] May 23, 1978

[54] LAWN MOWER CONSTRUCTION

[75] Inventor: Hachiro Doi, Kamifukuoka, Japan

[73] Assignee: Fuso Keigokin Co., Ltd., Japan

[21] Appl. No.: 643,756

[22] Filed: Dec. 23, 1975

[30] Foreign Application Priority Data

Dec. 28, 1974  Japan ..................... 50/3268
Dec. 28, 1974  Japan ..................... 50/3269

[51] Int. Cl.² ............................ A01D 55/26
[52] U.S. Cl. ........................ 56/13.6; 56/16.7; 56/255; 56/295
[58] Field of Search ............ 56/17.5, 16.7, 295, 56/255, 12.7, 13.6, 51–102, 320.2

[56] References Cited

U.S. PATENT DOCUMENTS

| 84,790 | 12/1868 | Bidwell | 56/295 |
| 1,207,580 | 12/1916 | Luce | 56/96 |
| 1,349,266 | 8/1920 | Cogburn | 56/53 |
| 3,135,081 | 6/1964 | Booth | 56/16.7 |
| 3,152,431 | 10/1964 | Ott et al. | 56/13.6 |
| 3,596,447 | 8/1971 | Makeham et al. | 56/63 |
| 3,601,960 | 8/1971 | Buechler | 56/320.2 |
| 4,027,463 | 6/1977 | Takahasi et al. | 56/255 |

Primary Examiner—Russell R. Kinsey
Attorney, Agent, or Firm—McGlew and Tuttle

[57] ABSTRACT

A lawn mower for cutting grass, comprises a frame having an open bottom and being closed on the sides except for a lateral discharge opening. A drive motor is supported on a top closed cover of the frame, and it includes a drive shaft which drives a rotatable cutter disc which is rotatably supported on a support member of the frame. At least one second cutter disc in the form of a counterdisc is supported on the support member superjacent the first cutter and overlapping a portion of the periphery thereof so that the cutting action on the grass is improved by the interaction of the first cutter and a second countercutter. In the preferred arrangement, the support member is formed in the form of a disc or a blade which is also rotated and it carries a transmission for rotating at least the cutter and preferably also the countercutter and at a speed which is different from the cutter speed. Preferably, a plurality of cutters and counter-rotating cutters are supported on a rotatable support member or blade.

13 Claims, 32 Drawing Figures

LAWN MOWER CONSTRUCTION

FIELD AND BACKGROUND OF THE INVENTION

This invention relates in general to the construction of lawn mowers and, in particular, to a new and useful lawn mower having a plurality of driven rotatably cutter discs which rotate closely adjacent a countercutter member which is also advantageously driven at a speed distinct from the first cutter.

DESCRIPTION OF THE PRIOR ART

At the present time many lawn mower constructions are known including, but not limited to, the shear type which includes two relatively movable sets of displaceable shear plates having individual sets of shear blades; a reel type having rotatable reels of blades, and the so-called rotatable blade type. All of the principal types have some disadvantages in respect to the types of cutting action which may be effected and a principal difficulty with each is that they do not effect an accurate and fine cutting of the grass blades and their cutting action is influenced greatly by the density of the grass which is being cut, and by its height, etc. In respect to the clipper type or moving shear type, the lawn may be cut neatly and with less injury to it, but the operation is usually slower and the drive mechanism is complicated and expensive. The rotatable reel type operates more quickly than the shear type, but it is difficult to produce a precise rotating cutting cylinder or reel and it is not easy to machine the cutting plates or to replace them with new ones. The rotary blade type is advantageous from the cost standpoint, but because the action of the blade is to sever the grass by mowing it down, the lawn is not cut off neatly and there is a possibility that the lawn becomes damaged. When a high speed rotating blade contacts any pebbles or wood pieces which may be hidden in the lawn, they may be propelled outwardly and they represent a danger to the operator.

SUMMARY OF THE INVENTION

The present invention is an improvement over the prior art inasmuch as it provides a lawn mower having a plurality of individual rotatable disc-type cutters which are mounted on a support member which advantageously may be rotated through a drive which is also advantageously connectable to rotate one of two interacting cutters which operate on the grass to cut it in an improved manner. The invention includes a first rotatable cutter which is driven by a gear drive from a drive motor and a second cutter which is mounted for rotation alongside the first and which is also advantageously driven at a speed distinct from the first cutter and which includes a periphery which engages either over or under the periphery of the first cutter. The second cutter is also advantageously mounted so that it is biased into engagement with the first cutter but it may be deflected against the bias in the event of passage of the lawn grass or other materials therethrough.

In one embodiment of the invention, the first cutter is rotatably mounted and one or more second cutters are mounted for movement as planetary cutter elements around the periphery of the first cutter in cooperative engagement therewith. The second cutter advantageously is provided with serrations or spaced recesses around the periphery to accommodate the material being cut and to facilitate the cutting action. The individual disc cutters may be of any configuration including circular, triangular, trapezoidal, etc. The support member for the cutters is advantageously rotated also and it may comprise, for example, a rotatable blade member or a rotatable disc. In one embodiment, the drive of the cutters is through frictional engagement of individual roller elements on a cylindrical member through relative rotative movement in respect to the cylindrical member.

Accordingly, it is an object of the invention to provide an improved lawn mower having one or more peripherally interengageable cutting discs with one arranged superjacent, either overlapping or underlying the periphery of the other and with means for driving at least one of the rotatable cutters or both, and preferably at distinct speeds, and also for providing a member mounting the disc elements which is also advantageously made rotatable.

A further object of the invention is to provide a lawn mower which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

GENERAL DESCRIPTION OF THE PRIOR ART

Figure 1:
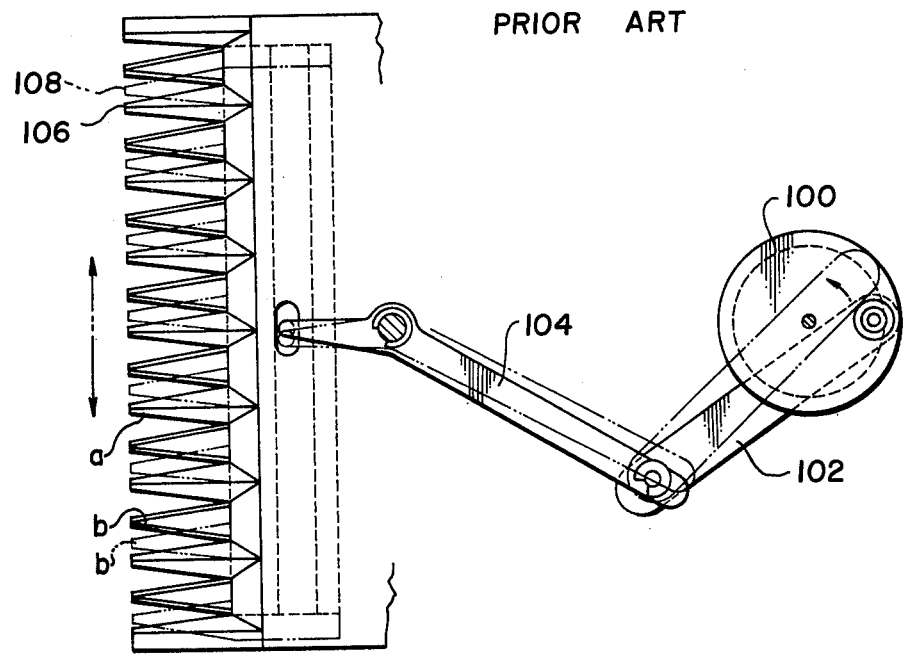
FIG. 1 is a partial top plan view of a shear or clipper type lawn mower construction of the prior art.

The known lawn mowers of the prior art may be broken up into three general types. The first type is the shear or clipper type, indicated in FIG. 1, which includes a rotatable drive member or crank member 100 which drives a crank link 102 through a lever arm 104 to move two shear plate members 106 and 108 back and forth in a reciprocatable movement in order to permit the individual blade elements $a$ and $b$ of the respective shear plates to cut the grass fed therebetween.

Figure 2:
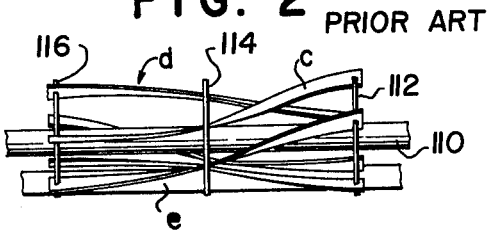
FIG. 2 is a partial elevational view of a reel-type lawn mower blade construction of the prior art.

The reel type mower shown in FIG. 2 includes a rotatable shaft 110 having a plurality of spaced reel plates 112, 114 and 116, which support a plurality of circumferentially spaced curved blade members $c$ which have outwardly extending cutting edges $d$. Rotation of the shaft 110 by suitable drive means causes revolving of the reels and the cutting of the grass by the rotating blade elements $c$ past a fixed cutter blade $e$.

Figure 3:
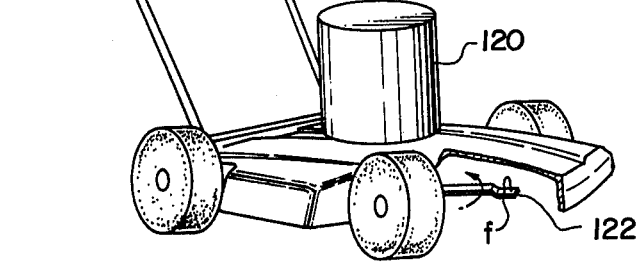
FIG. 3 is a lawn mower having a rotatable blade construction of the prior art.

The other prior art type is shown in FIG. 3 and it includes a drive motor 120 which operates a rotatable blade 122 to revolve it rapidly and to cause the forward edge $f$ thereof to cut the lawn grass.

DESCRIPTION OF THE PREFERRED EMBODIMENTS

Figure 4:
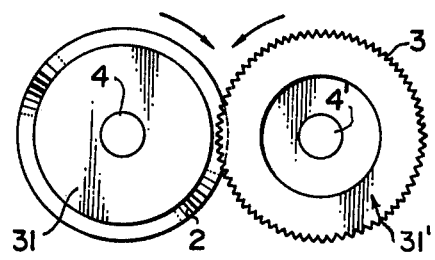
FIG. 4 is a plan view of the first and second cutting discs constructed in accordance with the invention.
Figure 5:
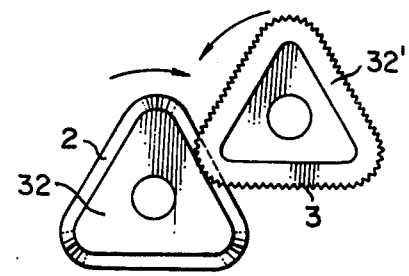
FIG. 5 is a plan view similar to FIG. 4 of another embodiment of the invention.
Figure 6:
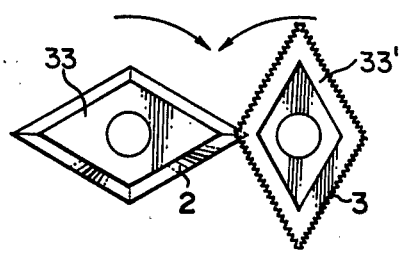
FIG. 6 is a plan view similar to FIG. 4 of still another embodiment of the invention.
Figure 7:
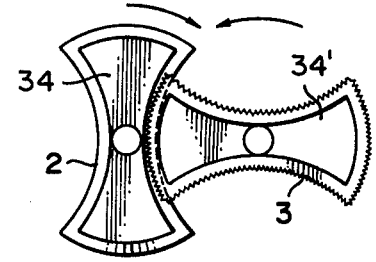
FIG. 7 is a plan view similar to FIG. 4 of still another embodiment of the invention.
Figure 8:
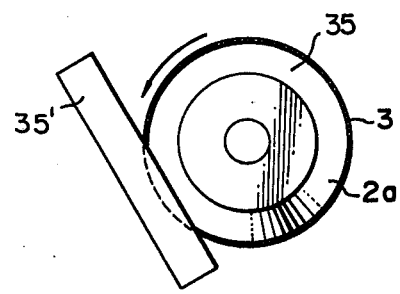
FIG. 8 is a plan view similar to FIG. 4 of still another embodiment of the invention.

Referring to the drawings in particular, the present invention comprises a lawn mower or lawn cutter for grass which in its simplest form as indicated in FIGS. 4 to 8, comprises a first rotatable cutter disc, generally designated 1, which is advantageously rotatably driven and which cooperates with a second rotatable cutter disc, generally designated 1' as shown in FIG. 4. The first disc 1 is advantageously mounted on shaft 4 which is driven through suitable drive means so as to rotate it in a location in which its periphery either overlaps or underlaps the periphery of the second rotatable disc 1' which is mounted on its associated shaft 4'. In the preferred form, a marginal area around the periphery of the second disc 1' is advantageously provided with circumferentially spaced recesses or slots 3 to facilitate the interaction of the two cutter discs and to permit the material to pass therethrough. The marginal edges 2 of the cutter disc 1 may advantageously be beveled as indicated in FIG. 4.

Figure 13:
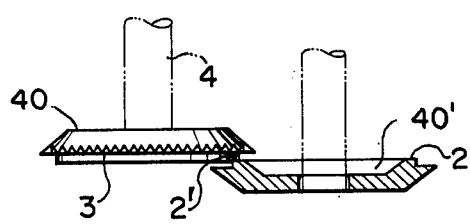
FIG. 13 is a partial side elevational view and partial actual sectional view, similar to FIG. 9 of still another embodiment of the invention.

FIGS. 5, 6, 7 and 8 show the identical arrangement for interengagement of cutter discs 31 and 31'; 32, 32'; 33, 33'; 34, 34'; 35, 35' which may be employed with the invention by way of example. Each cutter disc may be formed as a flat disc, or as a countersunk or cup-shape member. During rotation of the discs, one disc 31', 32', 33', 34', 35' rides over the periphery of the other disc and is advantageously pressed thereagainst by some biasing means. The notches or recesses 3 aid in the interaction of the two discs to permit the grass which is cut to be moved therethrough. The notches 3 of the second disc 31', 32, 33', 34, 35' may be made smooth if desired, or formed with stepped-off portions around the periphery, for example as shown by discs 40, 40' in FIG. 13.

Figure 9:
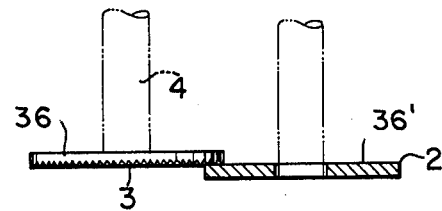
FIG. 9 is s partial side elevational and partial axial sectional view of a pair of cutting discs for the mower of the invention.
Figure 10:
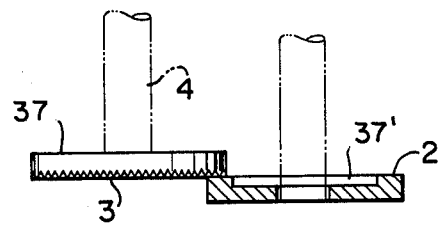
FIG. 10 is a partial side elevational view and partial actual sectional view, similar to FIG. 9 of another embodiment of the invention.
Figure 11:
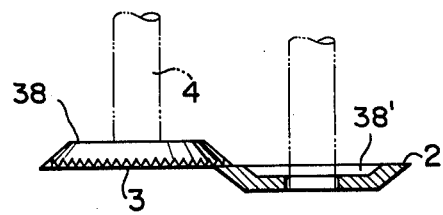
FIG. 11 is a partial side elevational view and partial actual sectional view, similar to FIG. 9 of still another embodiment of the invention.
Figure 12:
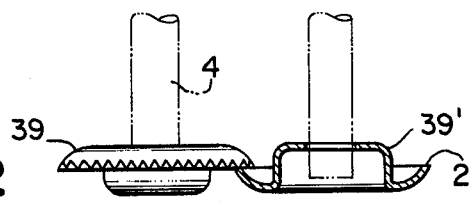
FIG. 12 is a partial side elevational view and partial actual sectional view, similar to FIG. 9 of still another embodiment of the invention.

In FIGS. 9 through 13, various types of formation of the rotary cutter discs 36 and 36'; 37, 37'; 38, 38'; 39, 39', 40 and 40' are indicated. From these views, it can be seen that the discs may comprise merely a flat plate, such as indicated in FIG. 9, a trough-shape plate as indicated in FIG. 10, a disc-shape plate as indicated in FIG. 11, a plate of annular formation of the type indicated in FIG. 12, or a plate having a recessed engagement surface of the type shown in FIG. 13.

Figure 14:
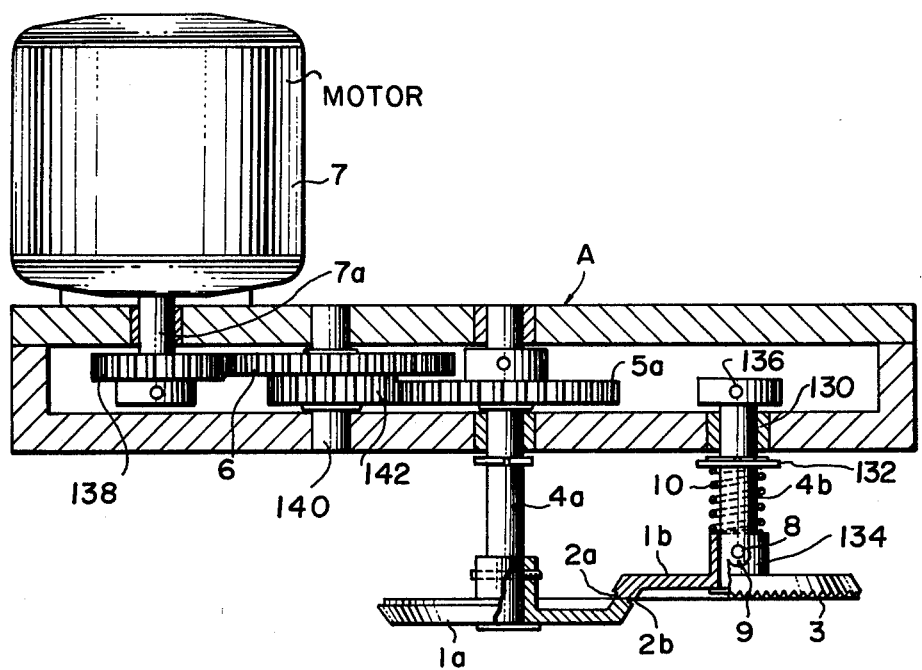
FIG. 14 is a transverse sectional view of a first embodiment of cutter mechanism assembly for a lawn mower constructed in accordance with the invention.
Figure 15:
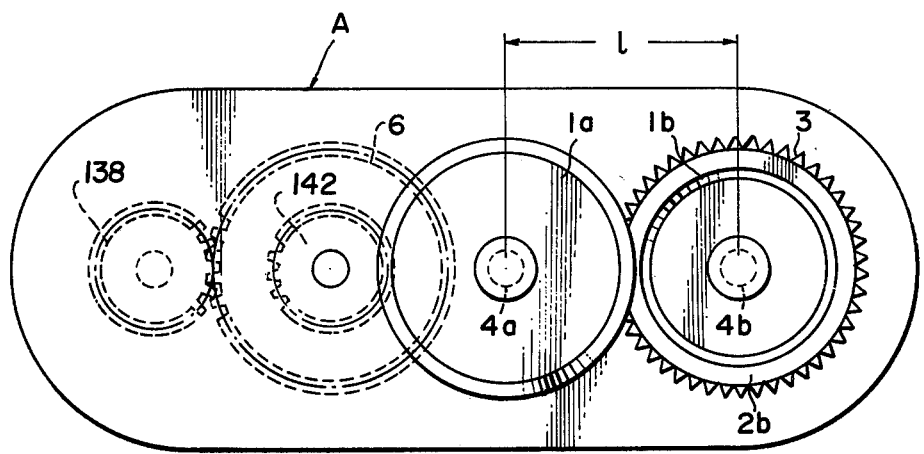
FIG. 15 is a bottom plan view of the construction shown in FIG. 14.

In an embodiment of the invention shown in FIGS. 14 and 15 the invention may be embodied as a rotatable cutter on a lawn mower which includes a drive motor 7, having a drive shaft 7a which, for example, forms a fixed mounting for a support member, generally designated A. In this embodiment, a first rotatable disc 1a is carried on a shaft 4a for rotation therewith and its periphery 2a underlies the periphery 2b of a second cutter disc 1b which is carried on a shaft 4b which is rotatably mounted in a journal 130 of a lower plate portion of the support A. A spring 10 compressed between a washer 132 and a raised hub portion 134 of the second cutter disc 1b biases the cutter disc 1b in a direction downwardly toward engagement with the cutter disc 1a. A pin member 8 extending through the shaft 4b engages in a slot 9 of the hub portion 134 and prevents relative rotation between shaft 4b and the second cutter disc 1b. The upper end of the shaft 4b is provided with a roller member or stop member 136 and, in this embodiment, the shaft 4b is not driven.

In accordance with the invention, at least a shaft 4a carrying the disc 1a is driven from motor 7 through a transmission which includes a drive gear 138 affixed on shaft 7a driving through a gear 6 on a stub shaft 140 and a further gear 142 on shaft 140 to a gear 5a comprising a sun gear carried on shaft 4a. The second cutter disc 1b is advantageously provided with a saw-tooth edge formed by notches 3.

Figure 16:
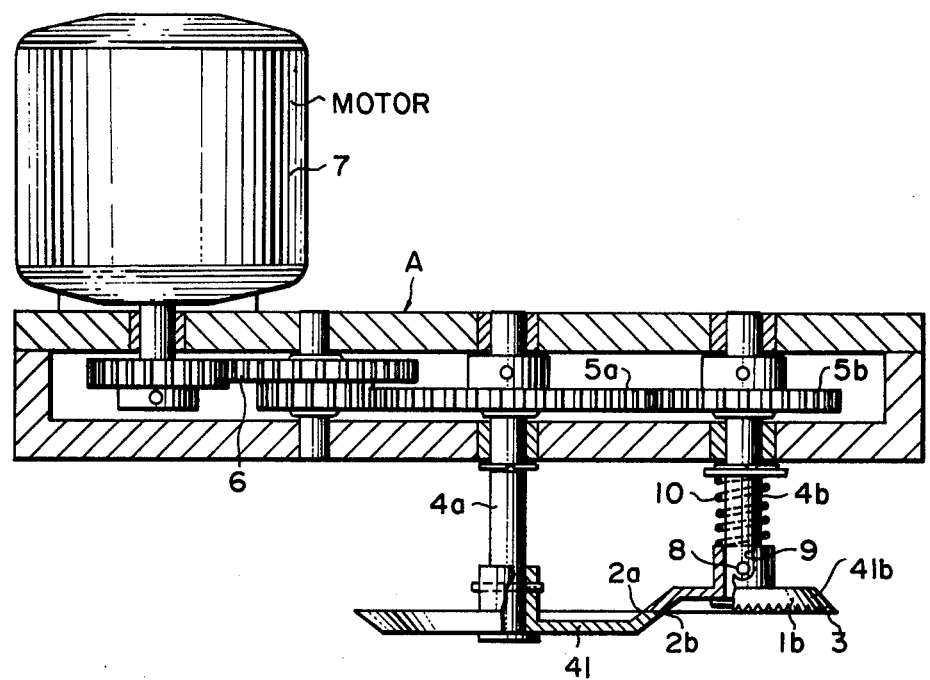
FIG. 16 is a view similar to FIG. 14 of another embodiment of the invention.
Figure 17:
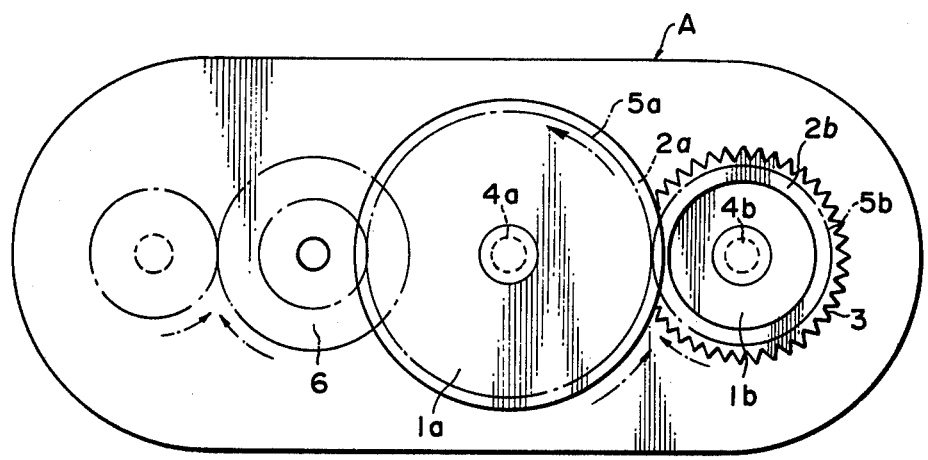
FIG. 17 is a bottom plan view of the embodiment shown in FIG. 16.

The embodiment shown in FIGS. 16 and 17 is substantially identical to that shown in FIGS. 14 and 15. The construction also includes a gear 5b which meshes with the sun gear 5a and which is carried at the upper end of shaft 4b so that the rotatable disc 41 is also driven positively from the motor 7. Spring 10 biases the second cutter disc 41b downwardly to engage against the periphery of the cutter disc 41 but it also permits upward removal therefrom in the event a large object becomes caught in between.

If the drive gear wheel 5a, 5b are provided with the same number of teeth, the cutter means will slide on each other always on the same portions of each, which may cause a non-uniform abrasion in the cutter means 1a, 1b. So, the drive gear wheels 5a, 5b are made with different numbers of teeth so that the cutter means 1a, 1b rotate at different peripheral speeds. Thus, the cutter means slide on each other over their different portions of their peripheries as they rotate, which results in a uniform abrasion and consequently, a longer life of the cutter means. And, since there occurs a pulling force between the cutter means because of the difference in peripheral speed, the lawn is cut more smoothly and neatly.

Figure 18:
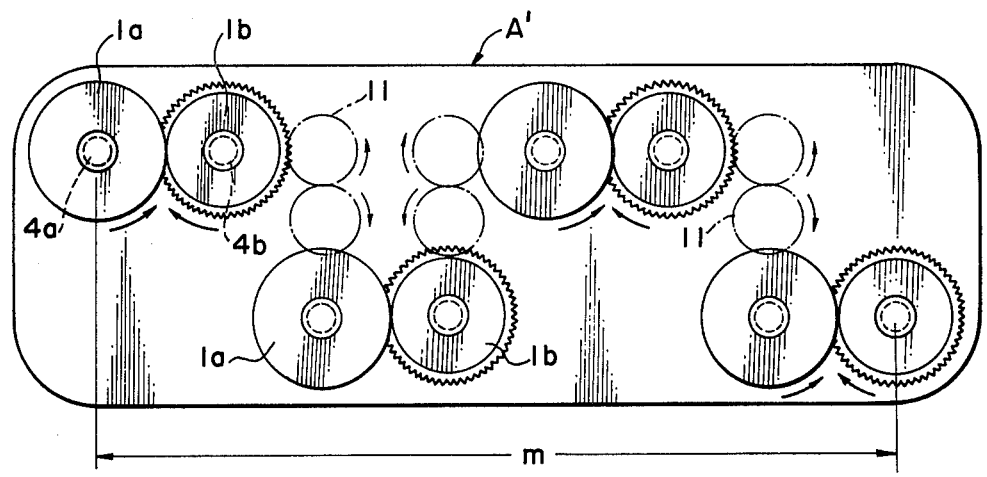
FIG. 18 is a bottom plan view of still another embodiment of the invention.

The embodiment shown in FIG. 18 includes a support member A' which carries a plurality of pairs of discs 1a and 1b, similar to the discs shown in the embodiment of FIGS. 14 and 15, but which are spaced across support A' from one side of the support to the other. In the arrangement shown, two sets of the discs 1a and 1b are offset from the other two, and a suitable gear transmission 11 is indicated as being positioned in a manner to drive all of the individual discs 1a and 1b from a common drive motor. In such an embodiment, support member A' may be mounted in a stationary manner and the width of the lawn which is cut indicated by the dimension m in FIG. 18.

Figure 19:
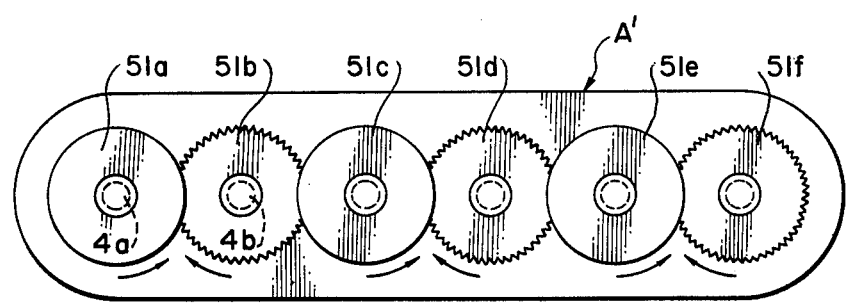
FIG. 19 is a bottom plan view of still another embodiment of the invention.

FIG. 19 is intended to show a variation of FIG. 18 wherein all of the discs 51a, 51b, 51c, 51d, 51e and 51f are aligned.

Figure 20:
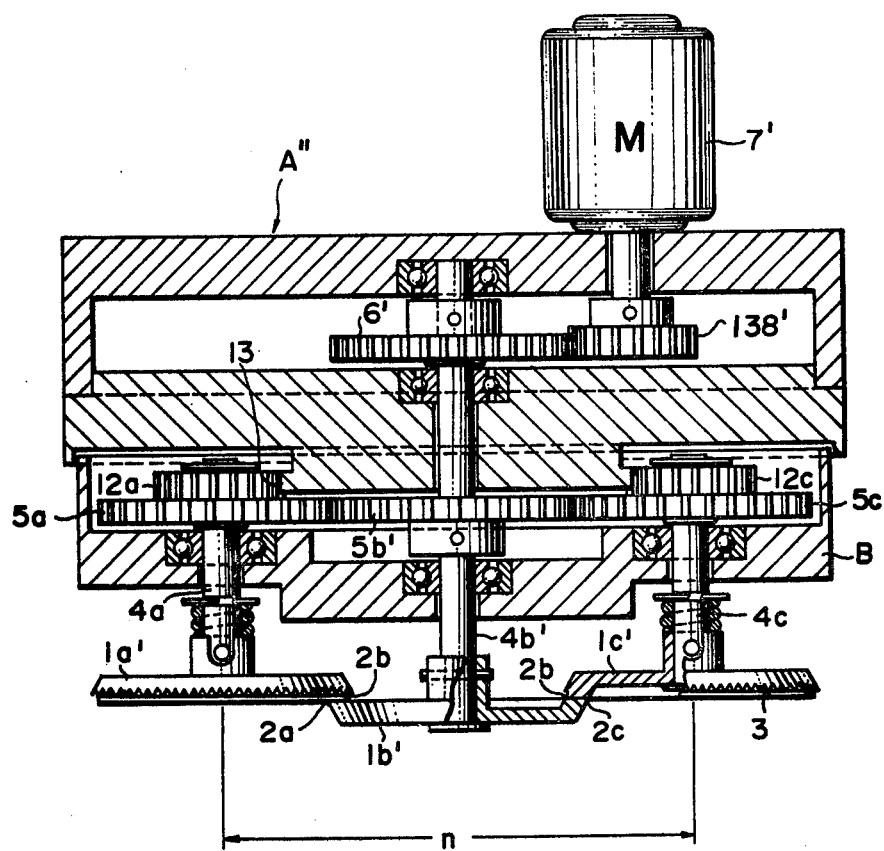
FIG. 20 is a partial sectional view similar to FIG. 14 of another embodiment of the invention.
Figure 21:
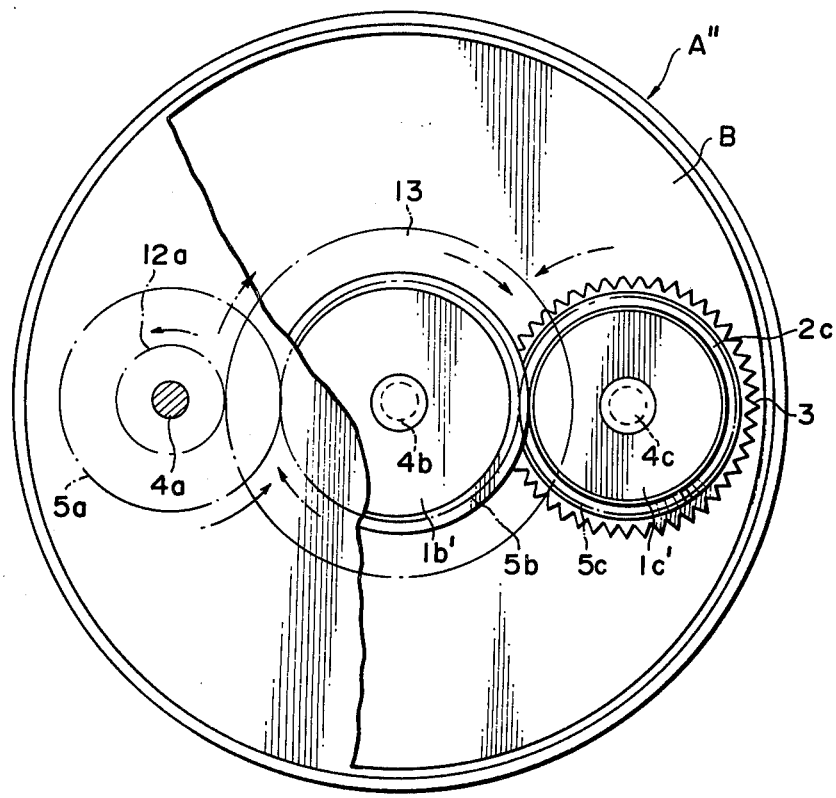
FIG. 21 is a bottom plan view of the embodiment shown in FIG. 20.

FIG. 20 shows an embodiment of the invention wherein a first disc in the form of a disc 1b' is arranged on a shaft 4b' for rotation by a drive motor 7' which is arranged to drive shaft 4b' through interengagement of drive gear 138' and a driven gear 6'. Shaft 4b' also carries a sun gear 5b' which drives planetary gears 5a, 5c, to rotate shafts 4a, 4c, carrying separate cutter discs 1a', 1c', which overlap one portion of the periphery of the first cutter disc 1b'. In this embodiment, the support member A" supports a rotatable support part B which carries the planetary gears and also provides a lower journal for the shaft 4b'. Transmission gear wheels 12a and 12c are also provided to cause an additional rotation of the shaft 4a and 4c as they rotate and revolve around a central gear 13 which is fixed to support A". In this embodiment, each of the three cutter disc members 1a', 1b' and 1c' are rotated and in addition, the individual cutter discs 1a' and 1c' are revolved around the periphery of cutter disc 1b'. A lawn mower constructed in this manner will have the effective cutting width n as shown in FIG. 20. The arrangement of the gearing in the cutter discs 1b' and 1c' are shown in FIG. 21.

Figure 22:
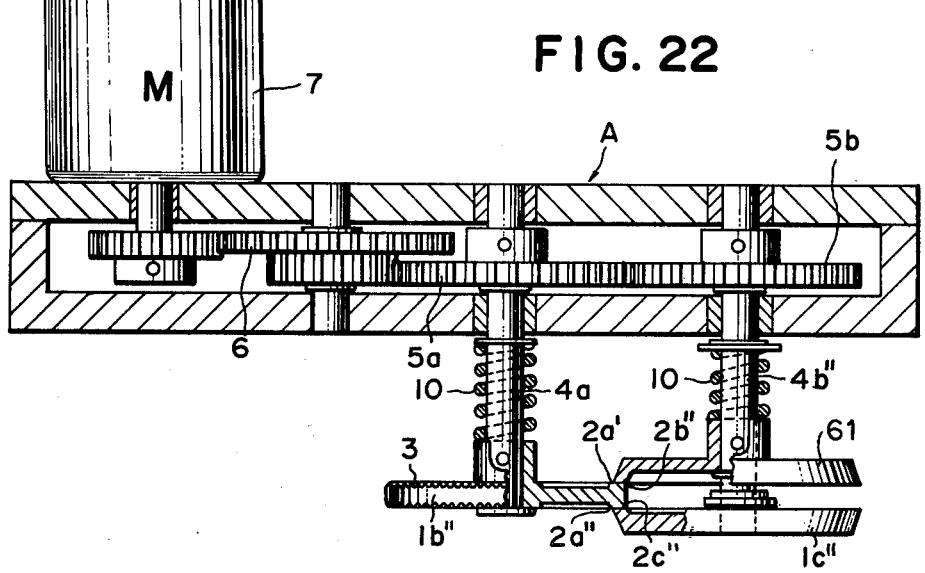
FIG. 22 is a view similar to FIG. 14 of still another embodiment of the invention.

FIG. 22 shows another embodiment of cutter arrangement wherein a first cutter disc member 1b" is arranged to cooperate with second upper and lower cutter disc members 61 and 1c" which are rotatably mounted on the same shaft 4b" and which have peripheries 2b" and 2c" which cooperate with respective upper and lower peripheries 2a' and 2a" of the first disc member 1b". In this embodiment, at least the upper cutter disc member 61 is biased in a direction toward engagement with the first cutter disc member 1b".

Figure 23:
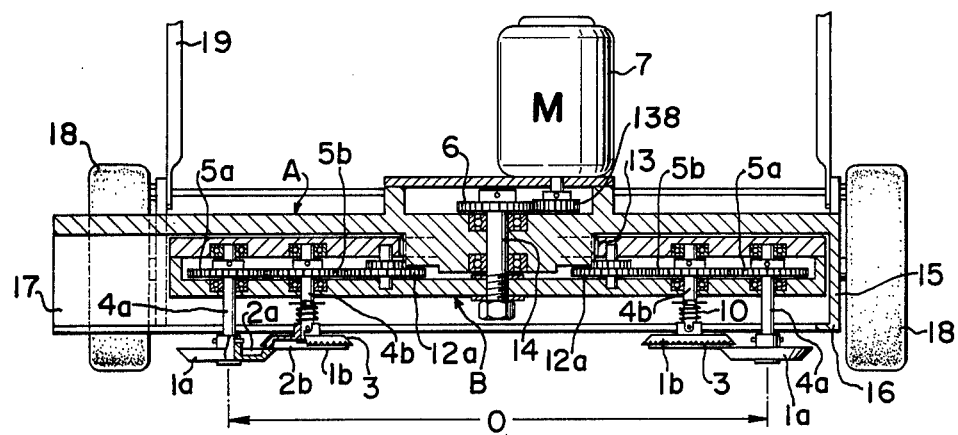
FIG. 23 is a transverse sectional view of an embodiment of lawn mower constructed in accordance with the invention.
Figure 24:
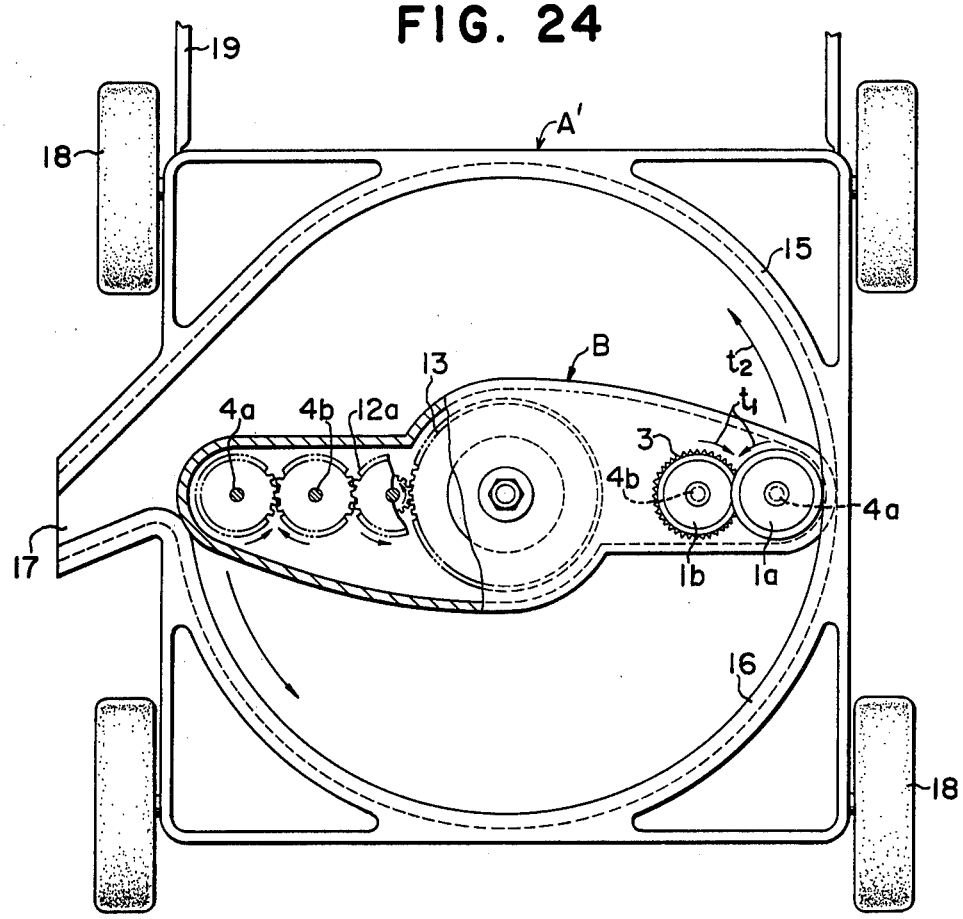
FIG. 24 is a partial plan and partial sectional view of the lawn mower shown in FIG. 23.

FIGS. 23 and 24 show a practical embodiment of the invention on a lawn mower which includes a frame A which is closed on the sides and the top but which has an open bottom with cutter means on a support member, generally designated B which depend downwardly through the open bottom in a position to cut the grass at the height above the ground as set by the position of side wheels 18, 18. The grass which is picked up is blown by the rotation of the cutter means through a discharge opening 17 on a side of the housing, generally designated A. The lawn mower may have self-propelled wheels 18 or it may be pushed or guided through a handle 19.

In the embodiment of FIGS. 23 and 24, the support B comprises a rotatable blade or fan-like member having radially extending arm portions carrying radially spaced shafts 4a and 4b for respective first rotatable disc members 1a and second rotatable disc members 1b. In this embodiment, drive gear wheels 5a and 5b engage with a transmission gear wheel 12a and the support B is also rotated through engagement with a gear 13 which is a fixed gear defined on the center of the frame A and concentric with the axis of rotation of the support B. In the embodiment of FIG. 23, the motor 7 drives a gear 6 through a drive shaft gear 138 to rotate a shaft 14 to cause the support member B to rotate in the direction indicated by the arrow $t_2$ of FIG. 24. This also causes the cutter means 1a and 1b to be rotated with their peripheries in engagement and with their direction of rotation being opposite. Such an arrangement permits the mowing of a lawn with sufficient cutting in the range indicated by O in FIG. 23. The drive gears 5a, 5b and 12a, 13 are sized so that the peripheral speed $t_1$ of the cutter means 1a and 1b are higher than the peripheral speed $t_2$ of support B. This means that the grass material taken in between the cutter means 1a and 1b may be cut off before being approached by the rotatable support B so that an efficient and positive mowing of the lawn, as well as a neat mowing, is accomplished. In addition, because of the rotation of the support B, the air is taken in through the skirt portion 15 of the frame A into the space between the frame bottom and the ground in order to create a wind pressure to draw up the blades of grass which are being cut and to prevent them from falling down. This effect may be more significant when the skirt portion 15 of the frame A is located close to its peripheral bottom edge and is provided with an inturned flange 16 which extends in for about 5 to 10 millimeters, or is curved inwardly. The cut lawn may also be forcibly delivered out through the exit opening 17 by the action. Suitable collector means or bags may be provided at the exit for this purpose.

Figure 25:
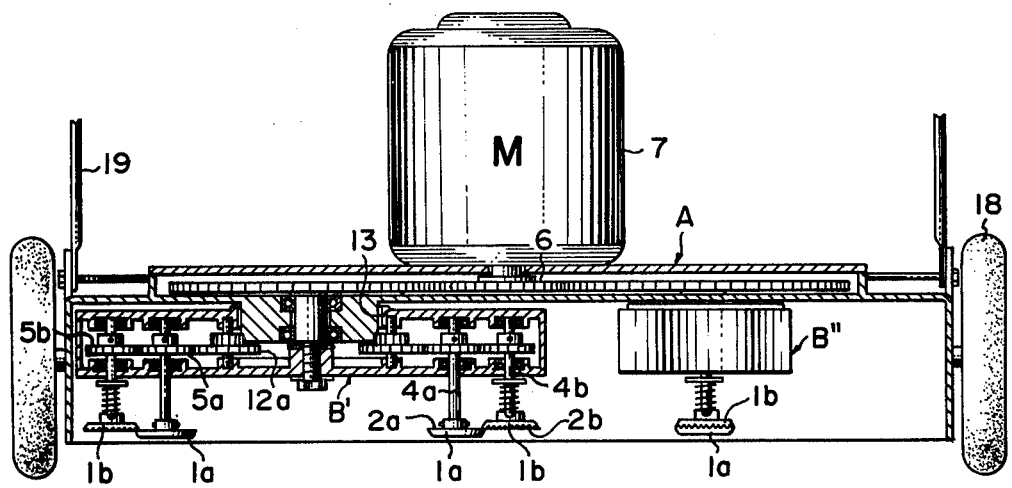
FIG. 25 is a view similar to FIG. 23 of another embodiment of the invention.
Figure 26:
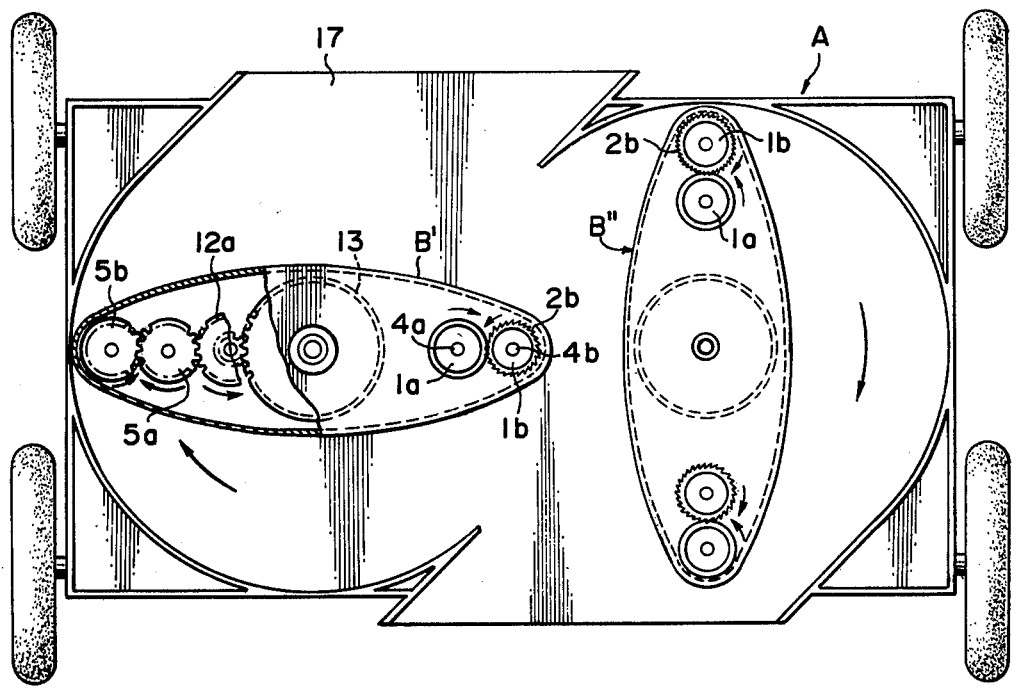
FIG. 26 is a bottom plan view of the embodiment shown in FIG. 25.

A further embodiment of the invention is shown in FIGS. 25 and 26, wherein there are two rotatable support members B' and B" which rotate in the same direction of rotation in separate formed portions of the housing. The support members B' and B" can however, rotate in opposite rotation directions. The timing of the rotation is such that they may be rotated simultaneously without interengagement even though they are of lengths which move the outer ends through the same rotational paths.

The individual cutter elements which are employed in the embodiments of FIGS. 4 to 26 are advantageously made in diameters of approximately 3 to 5 cm in order to ensure that the cutting action is uniform. Cutters may be supplied, however, which are of different shape such as in the embodiments to be described hereinafter.

Figure 27:
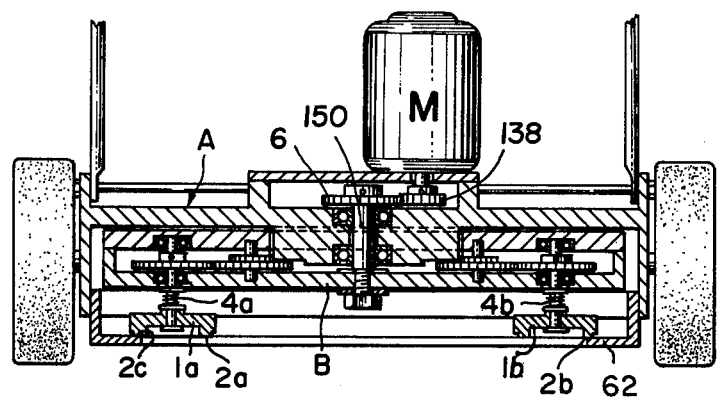
FIG. 27 is a view similar to FIG. 23 of another embodiment of the invention.
Figure 28:
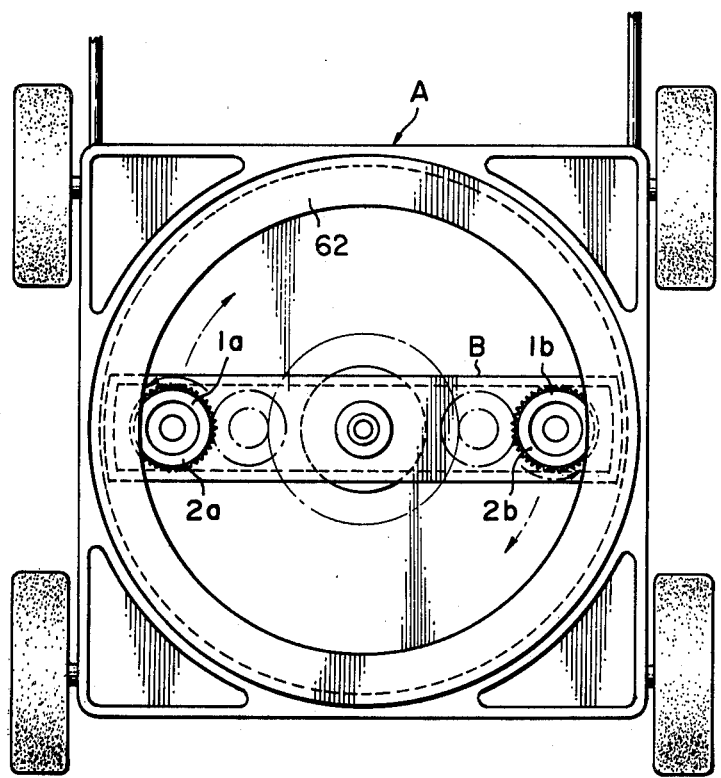
FIG. 28 is a bottom plan view of the embodiment shown in FIG. 27.

In accordance with the embodiment of FIGS. 27 and 28, the frame A which is similar to the frame construction of the other embodiments provides a central mounting for a motor M having the usual drive shaft with a drive gear 138 which drives a drive gear 6 of a rotation shaft 150 which carries a rotatable support frame member B. The rotatable support frame member B carries rotating shafts 4a and 4b on each arm portion of a pair of arms which extend in respective opposite radial directions. In this construction, there are a plurality of first cutters 1a which are rotatably mounted with their peripheries engaged over an annular surface formed by a fixed cutter 1c which is carried on the frame or forms a part of the frame A. Fixed cutter 1c comprises an annular cutting edge 2c which engages cooperatively with the cutting edge 2a of the rotatable cutter 1a so that, in this construction, the second cutter which cooperates with the first cutter is a stationary cutter and does not rotate.

Figure 29:
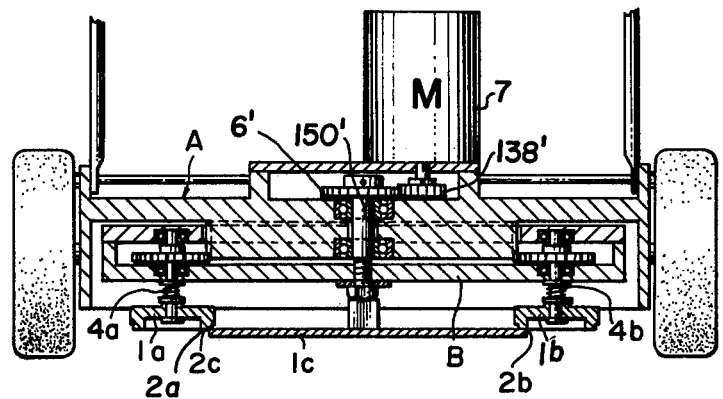
FIG. 29 is a view similar to FIG. 25 of still another embodiment of the invention.
Figure 30:
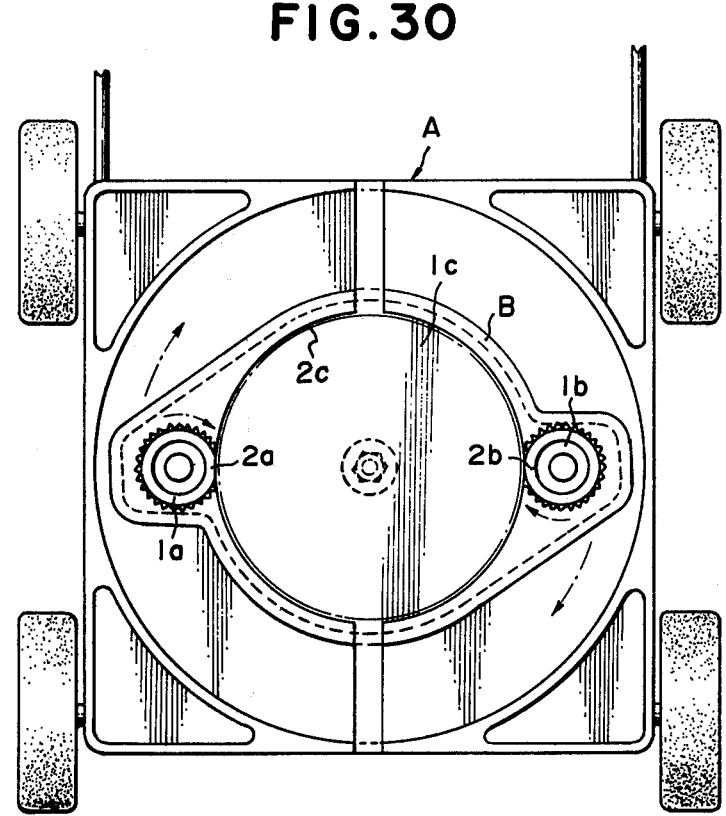
FIG. 30 is a bottom plan view of the embodiment shown in FIG. 29.

In the embodiment of FIGS. 29 and 30, there is an arrangement similar to FIGS. 27 and 28, with the exception that the fixed cutter means 62 are disc-shaped.

Figure 31:
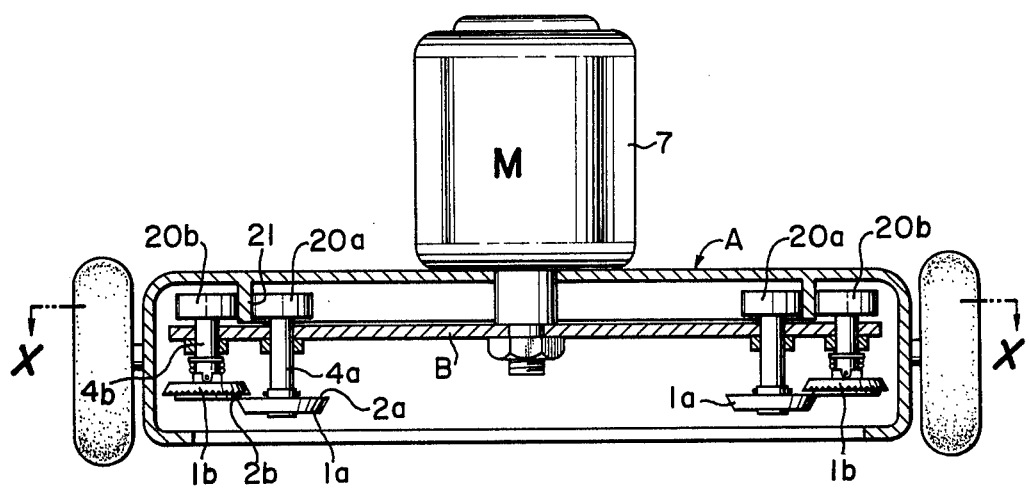
FIG. 31 is a view similar to FIG. 23 of another embodiment of the invention.
Figure 32:
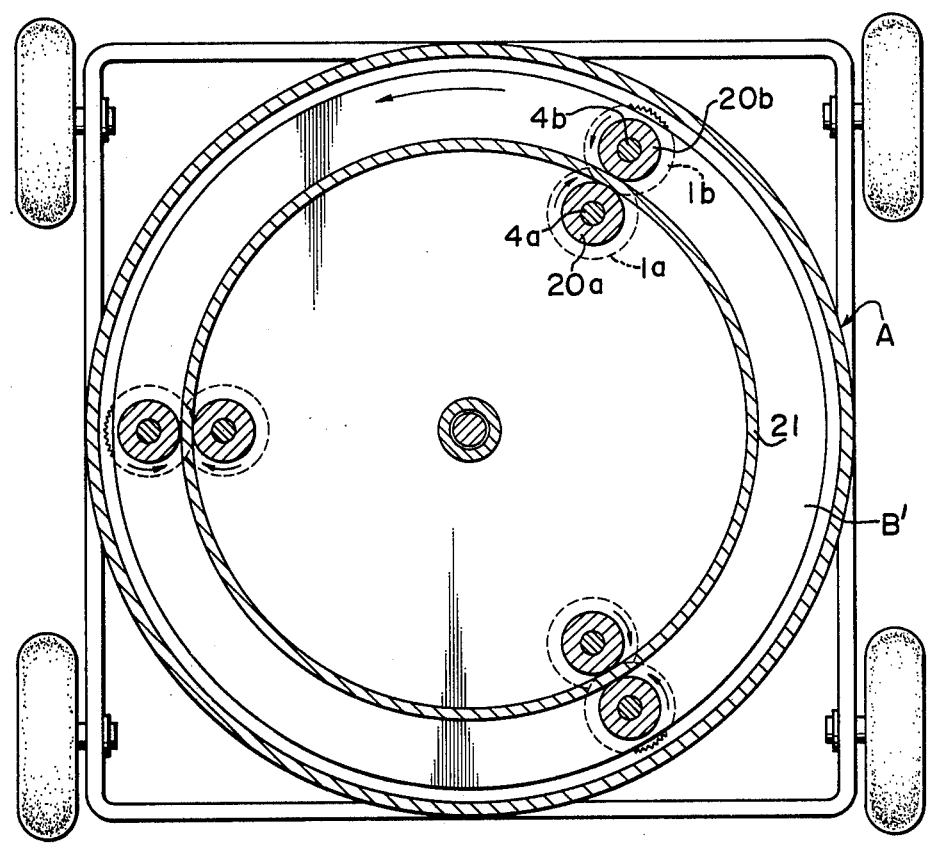
FIG. 32 is a bottom plan view of the embodiment shown in FIG. 31.

The drive for the cutters may be a frictional drive instead of a gear drive, as indicated in the embodiment of FIGS. 31 and 32 wherein the motor 7 rotates a support plate B' which carries a plurality of the first cutter elements 1a and a plurality of the second disc cutter members 1b. These cutter members 1a and 1b are arranged on their respective shafts 4a and 4b at radially spaced locations on each side of a central ring or friction wheel 21. Each shaft 4a carries a roller 20a which engages on one side of the friction wheel 21 and each shaft 4b carries a roller 20b which bears on the outer side of the ring 21. Rotation of support plate B' causes the frictional engagement of the individual rollers 20a and 20b with the respective sides of the ring 21 and the rotation thereof. Since rollers 20a and 20b are located on respective sides of the ring member, their rotation will be in different directions and at slightly different speeds.

Thus, the invention provides an arrangement wherein the grass which is cut is taken in between first and second cutter disc members which slide relatively with respect to each other due to their peripheral or other engagement and effect a positive cutting off of the grass as they move. This results in a neat lawn finish as well as an efficient and speedy mowing and without any non-uniform mowing or destruction of the grass. In addition, since the amount of lawn material which is taken between the first and second cutting discs is relatively small, the cutter will not be subjected to very great loads. The cutter may be driven by a motor, such as an internal combustion engine or an electrical drive motor of small capacity and this makes it possible to have an economical and safe device. The conventional rotary type of the mower makes it impossible to cut the grass unless the peripheral speed of rotation of the cutter is 60 m/sec – 90 m/sec. This invention makes it possible to cut the grass even if the speed of rotation of the rotating frame is less than 10 m/sec. Therefore, it has a high degree of safety. The conventional rotary type of the mower cannot cut the grass unless the cutter rotates at a higher speed. This invention makes possible to cut the grass so long as the cutter and the rotating frame rotates and no matter how slow they rotate. The construction of the mower is simple and inexpensive to manufacture.

While specific embodiments of the invention have been shown and described in detail to illustrate the application of the principles of the invention, it will be understood that the invention may be embodied otherwise without departing from such pricniples.

What is claimed is:

1. A lawn mower for cutting grass, comprising a frame having an open bottom and a lateral discharge opening, a support member mounted on said frame over the open bottom, at least one first cutter disc rotatably mounted on said support member above the opening at grass cutting height, at least one second cutter disc mounted on said support and having a periphery superjacent to and overlapping at least a portion of the periphery of said first cutter disc, and motor means on said frame connected to at least said first cutter disc to rotate said first cutter disc.

2. A lawn mower, according to claim 1, wherein said second cutter disc is rotatably mounted on said support and means biasing said second cutter disc in a direction toward engagement with said first cutter disc.

3. A lawn mower, according to claim 1, wherein said frame includes a closed top, said motor means includes a motor mounted on said closed top, said support member being rotatably supported on said frame top and driven by said motor.

4. A lawn mower for cutting grass, comprising a support member, means mounting said support member for movement over the grass including a closed housing overlying said support having a discharge for grass, at least one first cutter disc rotatably mounted on said support member for rotation about a substantially vertical axis, at least one second counter cutter disc mounted on said support and being disposed substantially parallel to and superjacent said first disc and having at least a portion of its periphery overlapping at least a portion of the periphery of said first cutter disc, and motor means connected to at least said first cutter disc to rotate said disc as said mounting means is moved over the grass.

5. A cutting mechanism, according to claim 4, wherein said second cutter disc member is rotatably mounted on said support member and means to bias said second cutter disc member toward engagement with said first cutter disc member.

6. A cutting mechanism, according to claim 4, wherein said second cutter disc is keyed to its associated shaft and movable axially therealong, and biasing means biasing said second cutter disc in a direction toward engagement with said first cutter disc.

7. A cutting mechanism, according to claim 4, wherein there are a plurality of pairs of first and second cutter discs arranged across said support member in lateral alignment.

8. A cutting mechanism for lawn movers for cutting grass, comprising a support member, at least one first cutter disc rotatably mounted on said support member for rotation about a substantially vertical axis, at least one second counter cutter disc mounted on said support and being disposed substantially parallel to and superjacent said first disc and having at least a prtion of its periphery overlapping at least a portion of the periphery of said first cutter disc, and motor means connected to at least said first cutter disc to rotate said disc; said first cutter disc member being carried on a rotatable shaft on said support member, said motor means comprising a gear drive rotating said first cutter disc shaft, said first cutter disc shaft having a sun gear thereon, said second cutter disc having a shaft with a planetary gear thereon in engagement with said sun gear, said support member carrying said second disc member shaft for rotation and for revolving around said sun gear and said first cutter disc member shaft.

9. A lawn mower for cutting grass, comprising a support member, means mounting said support member for movement over the grass including a closed housing overlying said support having a discharge for grass, at least one first cutter disc rotatably mounted on said support member for rotation about a substantially vertical axis, at least one second counter cutter disc mounted on said support and being disposed substantially parallel to and superjecent said first disc and having at least a portion of its periphery overlapping at least a portion of the periphery of said first cutter disc, and motor means connected to at least said first cutter disc to rotate said disc as said mounting means is moved over the grass; said motor means comprising a drive motor having a drive shaft, first and second shafts carrying said first and second cutter disc members and gear means between said motor drive shaft and said first cutter disc shaft for rotating said first cutter disc shaft with said cutter disc member.

10. A cutting mechanism, according to claim 9, wherein said gear means is connected to said second cutter disc shaft to rotate said second cutter disc shaft in an opposite direction to said first cutter disc shaft.

11. A lawn mower, according to claim 9, wherein said gear means includes a gear drive to said second cutter disc for rotating said second cutter disc at a greater speed than said first cutter disc and in an opposite direction.

12. A lawn mower for cutting grass, comprising a frame having an open bottom and a lateral discharge opening, a support member mounted on said frame over the open bottom, at least one first cutter disc rotatably mounted on said support member above the opening at grass cutting height, at least one second cutter disc mounted on said support and having a periphery superjacent to and overlapping at least a portion of the periphery of said first cutter disc, and motor means on said frame connected to at least said first cutter disc to rotate said first cutter disc, said motor means comprising a drive motor, and gear means connected between said drive motor and said first cutter disc to rotate said first cutter disc.

13. A lawn mower for cutting grass, comprising a frame having an open bottom and a lateral discharge opening, a support member mounted on said frame over the open bottom, at least one first cutter disc rotatably mounted on said support member above the opening at grass cutting height, at least one second cutter disc mounted on said support and having a periphery superjacent to and overlapping at least a portion of the periphery of said first cutter disc, and motor means on said frame connected to at least said first cutter disc to rotate said first cutter disc, said frame including a closed top, a motor mounted on said closed top, said support member being rotatably supported on said frame top and driven by said motor, said support member including a plurality of radially extending arms, each having at least one pair of first cutter disc members and second cutter disc members, said gear means comprising a fixed gear defined on said frame, and each of said pairs of cutter discs having a gear connection to said fixed gear for rotation of said cutter discs during rotation of said support member around said fixed gear.

* * * * *